(12) United States Patent
Schoonmaker (10) Patent No.: US 11,401,135 B2
(45) Date of Patent: Aug. 2, 2022

(54) PINNED TELESCOPING CRANE BOOM

(71) Applicant: Manitowoc Crane Companies, LLC, Milwaukee, WI (US)

(72) Inventor: Stephen J. Schoonmaker, Chambersburg, PA (US)

(73) Assignee: Manitowoc Crane Companies, LLC, Milwaukee, WI (US)

( * ) Notice: Subject to any disclaimer, the term of this patent is extended or adjusted under 35 U.S.C. 154(b) by 0 days.

(21) Appl. No.: 16/976,396

(22) PCT Filed: Mar. 12, 2019

(86) PCT No.: PCT/US2019/021810
§ 371 (c)(1),
(2) Date: Aug. 27, 2020

(87) PCT Pub. No.: WO2019/178067
PCT Pub. Date: Sep. 19, 2019

(65) Prior Publication Data
US 2020/0407199 A1    Dec. 31, 2020

Related U.S. Application Data (60) Provisional application No. 62/641,580, filed on Mar. 12, 2018.

(51) Int. Cl.
*B66C 23/70* (2006.01)
*F16H 19/06* (2006.01)
*B66C 23/36* (2006.01)

(52) U.S. Cl.
CPC .......... *B66C 23/703* (2013.01); *B66C 23/708* (2013.01); *F16H 19/0618* (2013.01); *B66C 23/36* (2013.01)

(58) Field of Classification Search
CPC .. B66C 23/703; B66C 23/708; F16H 19/0618
See application file for complete search history.

(56) References Cited

U.S. PATENT DOCUMENTS 4,592,474 A * 6/1986 Rathe .................... B66C 23/701
                                                            212/292
7,044,315 B2    5/2006 Willim
(Continued)

FOREIGN PATENT DOCUMENTS

| DE | 19641191 A1 | 3/1998 |
| EP | 1055635 A2 | 11/2000 |
| EP | 1369373 A2 | 12/2003 |

OTHER PUBLICATIONS

DE 19641191A1 Machine Translation (Year: 1998).*
(Continued)

*Primary Examiner* — Michael R Mansen
*Assistant Examiner* — Juan J Campos, Jr.
(74) *Attorney, Agent, or Firm* — Cook Alex Ltd.

(57) ABSTRACT

A drive system (46) for a telescoping boom (22) includes an elongated member (48), a locking head (50) configured to be driven on the elongated member, an actuator (52) configured to drive the locking head on the elongated member, and a cabling assembly (54) interconnected between the actuator and the locking head such that the locking head is driven on the elongated member in response to operation of the actuator, the cabling assembly including a cable (64) and a plurality of sheaves (66, 68). The telescoping boom includes a base section (34) and one or more telescoping sections (36, 38, 40) configured for telescoping movement relative to the base section, and the locking head is configured to selectively engage and disengage a telescoping section of the one or more telescoping sections.

14 Claims, 10 Drawing Sheets

(56) References Cited

U.S. PATENT DOCUMENTS

2004/0060887 A1* 4/2004 Willim .................. B66C 23/828
 212/348
2015/0041422 A1* 2/2015 Kaupert ................ B66C 23/708
 212/292

OTHER PUBLICATIONS

International Search Report and Written Opinion of the International Search Authority dated Jun. 27, 2019, issued in connection with corresponding PCT/US2019/021810.

* cited by examiner

PINNED TELESCOPING CRANE BOOM

BACKGROUND

The present disclosure relates generally to a telescoping boom, and in particular, a drive system for extending and retracting sections of a telescoping boom.

A telescoping boom assembly is commonly used in lifting equipment, such as a crane. The telescoping boom assembly includes a plurality of telescopically arranged sections configured for telescoping movement relative to one another to extend and retract the assembly. The telescopically arranged sections include a telescopically fixed base section, and one or more movable sections extendable outward relative to the base section and retractable into the base section.

In the known assembly, the movable sections are driven by a telescoping cylinder. The telescoping cylinder is disposed in the base section, and in a retracted position has a length that generally corresponds to a length of the base section. The telescoping cylinder has a locking pin system configured to selectively engage and disengage individual movable sections. The locking pin system also couples and uncouples adjacent sections of the telescoping boom assembly. The locking pin system engages a first movable section and the telescoping cylinder extends to telescopically extend the first movable section outward from the base section. In the extended position, the telescoping cylinder has a length that generally corresponds to a combined length of the base section and the first, extended, movable section. The first movable section is then coupled to a second, adjacent, movable section by the locking pin system. The locking pin system then disengages from the first movable section and the telescoping cylinder is retracted into the base section. This process may be repeated to extend additional movable sections. For example, the telescoping cylinder, in the retracted position, may engage the second movable section and move to the extended position to drive the second movable section outward from the base section. The first movable section, coupled to the second movable section as described above, is movable with the second movable section to be further extended away from the base section. The second movable section may then be coupled, the locking pin system disengaged, and the telescoping cylinder retracted as described above.

Conversely, to retract the telescoping boom assembly, the telescoping cylinder may be moved to the extended position with the locking pin system disengaged from the movable sections. In the extended position, the locking pin system then engages, for example, the second movable section, the second movable section is uncoupled from an adjacent section, and the telescoping cylinder is retracted, to retract the second movable section into the base section. The first movable section moves with the second movable section, and thus, is moved toward the base section. The locking pin system may then disengage the second movable section and the process may be repeated to retract the first movable section.

The movable sections are extended and retracted at a speed equal to an extension and retraction speed of the telescoping cylinder. In addition, as noted above, the telescoping cylinder extends to a length that generally corresponds to the combined length of the base section and a movable section and retracts to a length that generally corresponds to a length of the base section. Thus, to reposition the telescoping cylinder when disengaged from a movable section, the telescoping cylinder must extend or retract a distance that is generally equal to a full length of a movable section. Both scenarios, i.e., extending or retracting a movable section, and repositioning the telescoping cylinder, may be undesirably time consuming and are a constraint on the number of lifts that may be performed in a fixed time period. Further, in the extended position, the telescoping cylinder extends outward from the base section, which distributes a weight of the telescoping cylinder away from a fulcrum of the telescoping boom assembly. This has the effect of increasing a load on the telescoping boom assembly, and in turn, reducing a maximum load which may be lifted by the telescoping boom assembly.

Further still, the telescoping cylinder incorporates actuators, valves, sensors and electronic modules with control software to engage and couple the movable sections during extension and retraction operations. To this end, a trombone tube may be built into the telescoping cylinder to operate the locking pin system. The trombone tube provides pressure to the locking pin system. However, the pressure in the trombone tube, in some instances, is sufficiently high so as to move the entire telescoping cylinder relative to a section of the telescopically arranged sections. Thus, the telescoping cylinder may be moved out of a proper position for operation of the locking pin system. As a result, engagement of a telescopically arranged section by the telescoping cylinder or coupling and uncoupling of adjacent sections may be difficult to achieve.

Accordingly, it is desirable to provide a telescoping boom having improved extension, retraction and repositioning speeds, improved weight distribution, and an independent lock actuator.

SUMMARY

According to one aspect, a telescoping boom includes a plurality of boom sections including a base section and one or more telescoping sections configured for telescoping movement relative to the base section, an elongated member disposed in the base section, a locking head configured for movement on the elongated member and configured to selectively engage and disengage a telescoping section of the one or more telescoping sections, an actuator configured to drive the locking head along the elongated member, and a cabling assembly interconnected between the actuator and the locking head such that the locking head is driven to move along the elongated member in response to operation of the actuator. The cabling assembly includes a cable and a plurality of sheaves. In one embodiment, the actuator may be a rod-barrel assembly. In another embodiment, the actuator may be a cable drum.

According to another aspect, there is provided a drive system for a telescoping boom, the drive system including an elongated member, a locking head configured to be driven on the elongated member, an actuator configured to drive the locking head on the elongated member, and a cabling assembly interconnected between the actuator and the locking head such that the locking head is driven on the elongated member in response to operation of the actuator. The cabling assembly includes a cable and a plurality of sheaves. In one embodiment, the actuator may be a rod-barrel assembly. In another embodiment, the actuator may be a cable drum.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
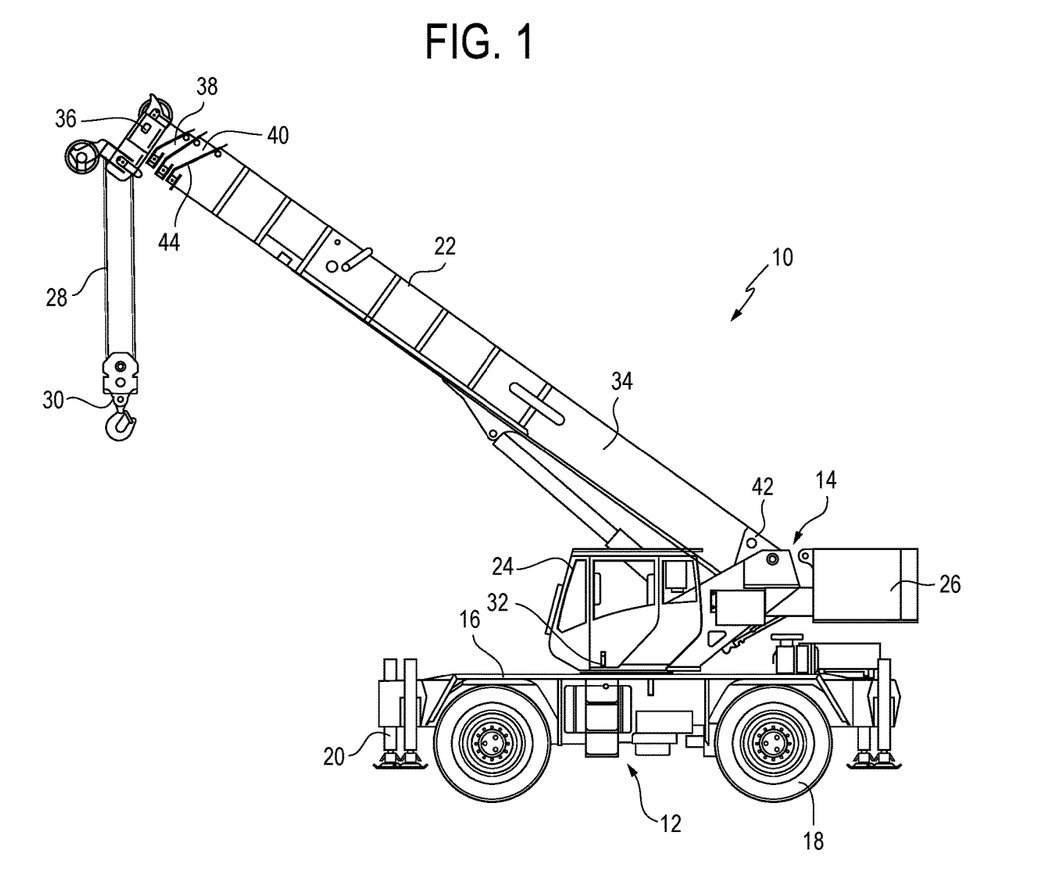
FIG. 1 is a side view of a crane having a telescoping boom according to an embodiment.

FIG. 1 is a side view of a crane 10 according to an embodiment described herein. The crane 10 may be, for example, a mobile crane such as a rough-terrain crane, an all-terrain crane, a truck-mounted crane, an industrial crane or a boom truck. The crane 10 includes, generally, a carrier 12 and a superstructure 14 mounted on the carrier 12. The carrier 12 generally includes a frame 16 and rolling ground engaging elements 18, such as tires. The carrier 12 may also include one or more outrigger assemblies 20.

The superstructure 14 includes a telescoping boom 22. The superstructure 14 may also include, for example, an operator cab 24, a counterweight assembly 26 and a hoist (not shown) for winding and unwinding of a flexible member 28, such as a rope or cable. The flexible member 28 may extend generally along the telescoping boom 22 and have a free end suspended from the telescoping boom 22. A lifting appliance 30, such as a hook block, may be attached to the free end of the flexible member 28 for engaging a load (not shown). The superstructure 14 may also include a rotatable bed 32 for rotatably mounting the superstructure 14 on the carrier 12.

Figure 6:
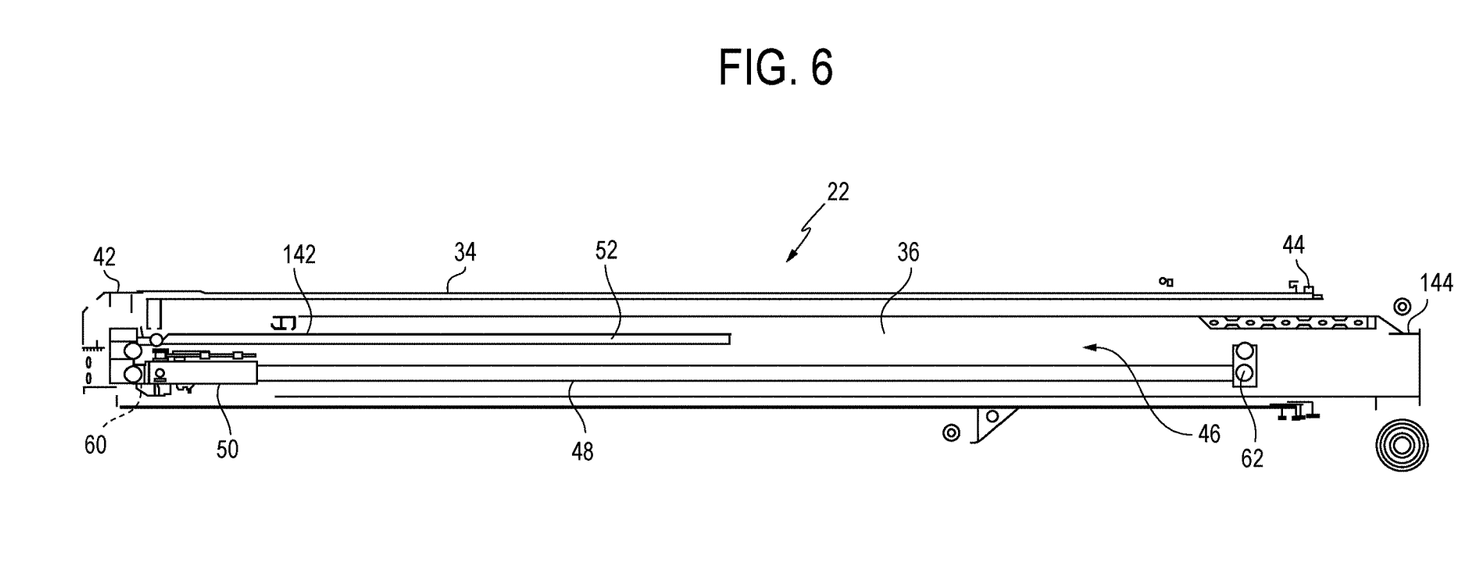
FIG. 6 is a diagram showing a cross-sectional view of a telescoping boom having a drive system and a telescoping section retracted within another boom section according to an embodiment.

Referring still to FIG. 1, the telescoping boom 22 is formed by a plurality of boom sections 34, 36, 38, 40. The plurality of boom sections 34, 36, 38, 40 includes a base section 34 and one or more telescoping sections 36, 38, 40 movable relative to the base section 34. In one embodiment, the one or more telescoping sections 36, 38, 40 may include, for example, a first telescoping section 36, a second telescoping section 38 and a third telescoping section 40. However, it is understood that references to the first, second and third telescoping sections 36, 38, 40, and drawings depicting the same, are provided for illustrative purposes, and do not limit the present disclosure to telescoping booms having only three telescoping sections. For example, the telescoping boom 22 according to different embodiments may have only one telescoping section 36, as shown in FIG. 6 and described below. Alternatively, the telescoping boom 22 may include two telescoping sections or more than three telescoping sections.

Each boom section 34, 36, 38, 40 has a base end 42 and a distal end 44. Although only the base end 42 and the distal end 44 of the base section 34 are labeled in FIG. 1, it is understood that each telescoping section 36, 38, 40 also has a base end and distal end. For example, as shown in FIG. 6, the first telescoping section 36 includes the base end 142 and the distal end 144. A length of each boom section 34, 36, 38, 40 is defined between the base end and distal end of the respective boom section. In one embodiment, the base end 42 of the base section 34 may be coupled to the rotatable bed 32 or other portion of the superstructure 14, such that the base section 34 is fixed against telescoping movement.

The telescoping boom 22 is movable between a retracted boom position (FIG. 1) and an extended boom position (not shown). In the retracted boom position, the one or more telescoping sections 36, 38, 40 are substantially retracted into the base section 34 in a nested configuration. For example, in the retracted position, the first telescoping section 36 is received within the second telescoping section 38, the second telescoping section 38 is received within the third telescoping section 40, and the third telescoping section 40 is received within the base section 34.

It will be appreciated by those having skill in the art that in the extended boom position the first telescoping section 36 is moved telescopically outward relative to the second telescoping section 38, so as to extend outwardly from the distal end of the second telescoping section 38. Similarly, the second telescoping section 38 is moved telescopically outward relative to the third telescoping section 40, and the third telescoping section 40 is moved telescopically outward relative to the base section 34. It is understood that intermediate boom positions may be achieved by partial extension of the one or more telescoping sections 36, 38, 40.

Figure 2:
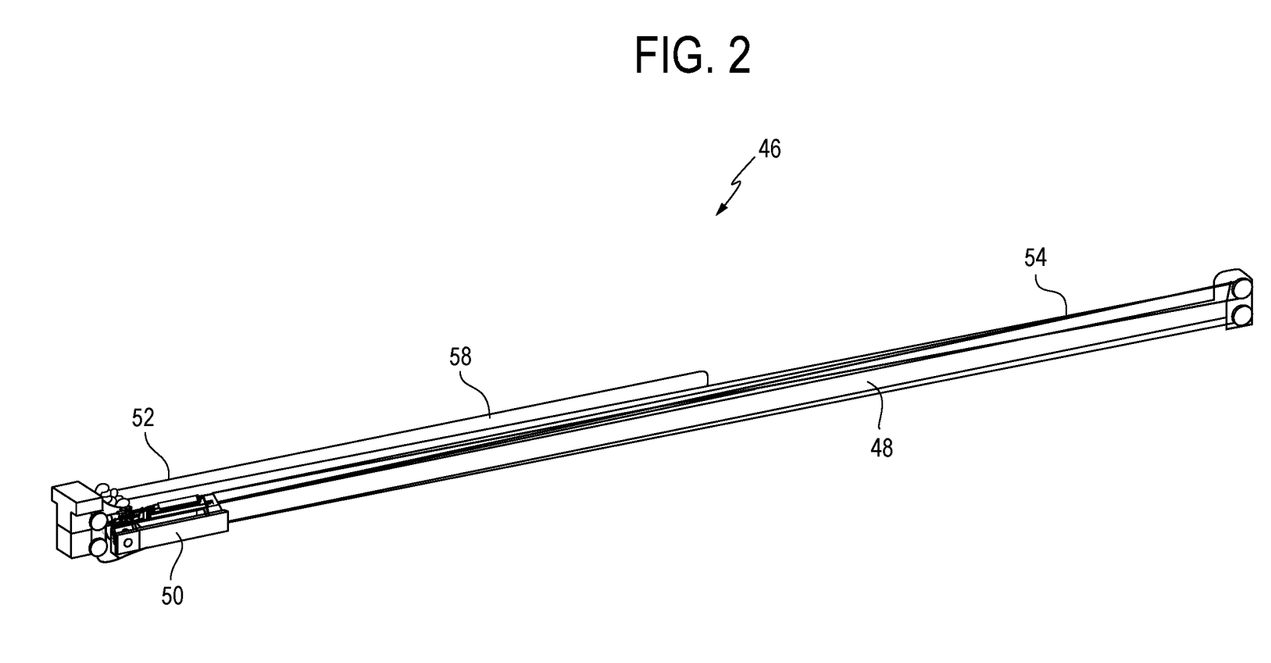
FIG. 2 is a perspective view of a drive system for a telescoping boom in a retracted drive position, according to an embodiment.
Figure 3:
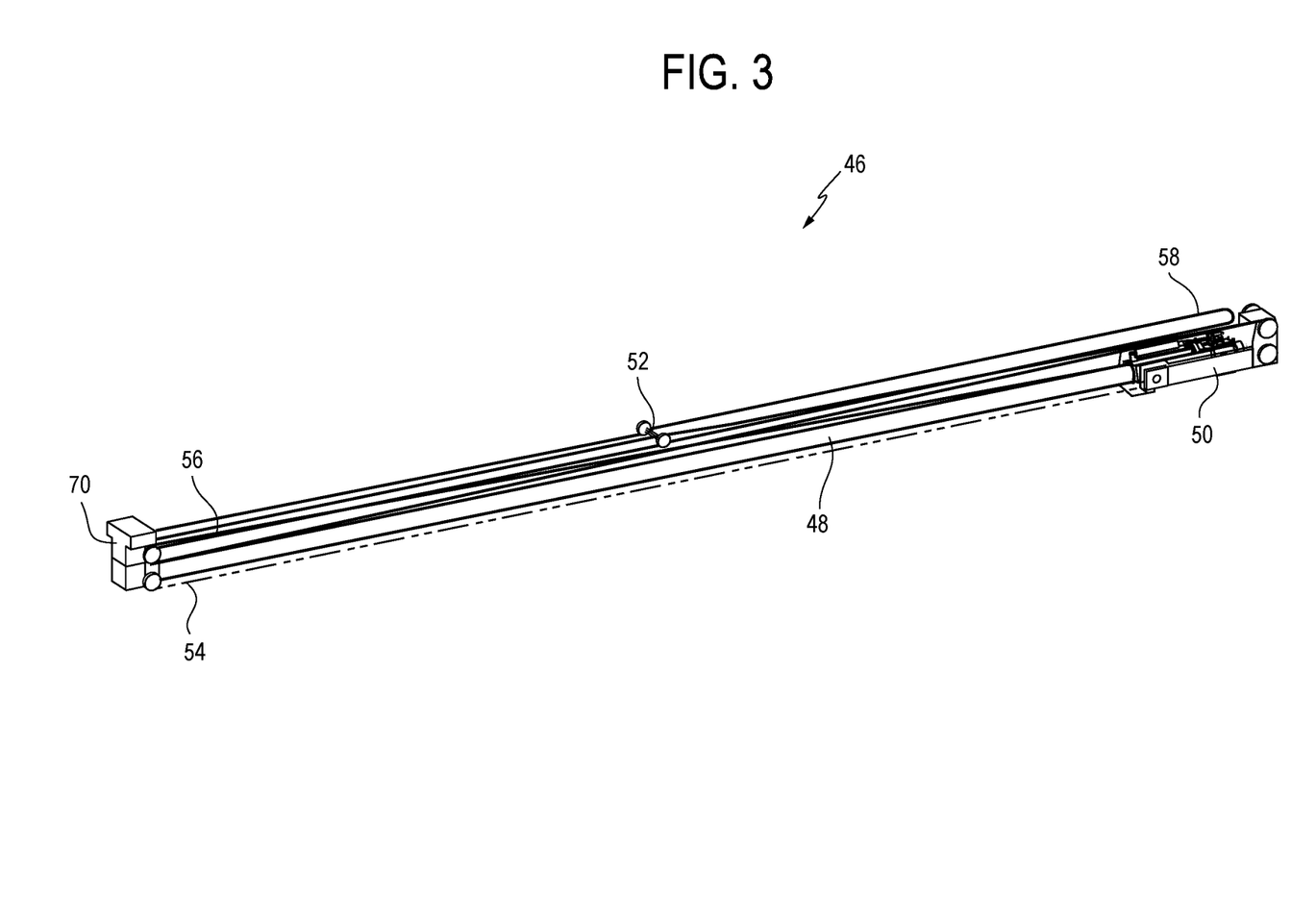
FIG. 3 is a perspective view of the drive system for a telescoping boom of FIG. 2 in an extended drive position, according to an embodiment.
Figure 4:
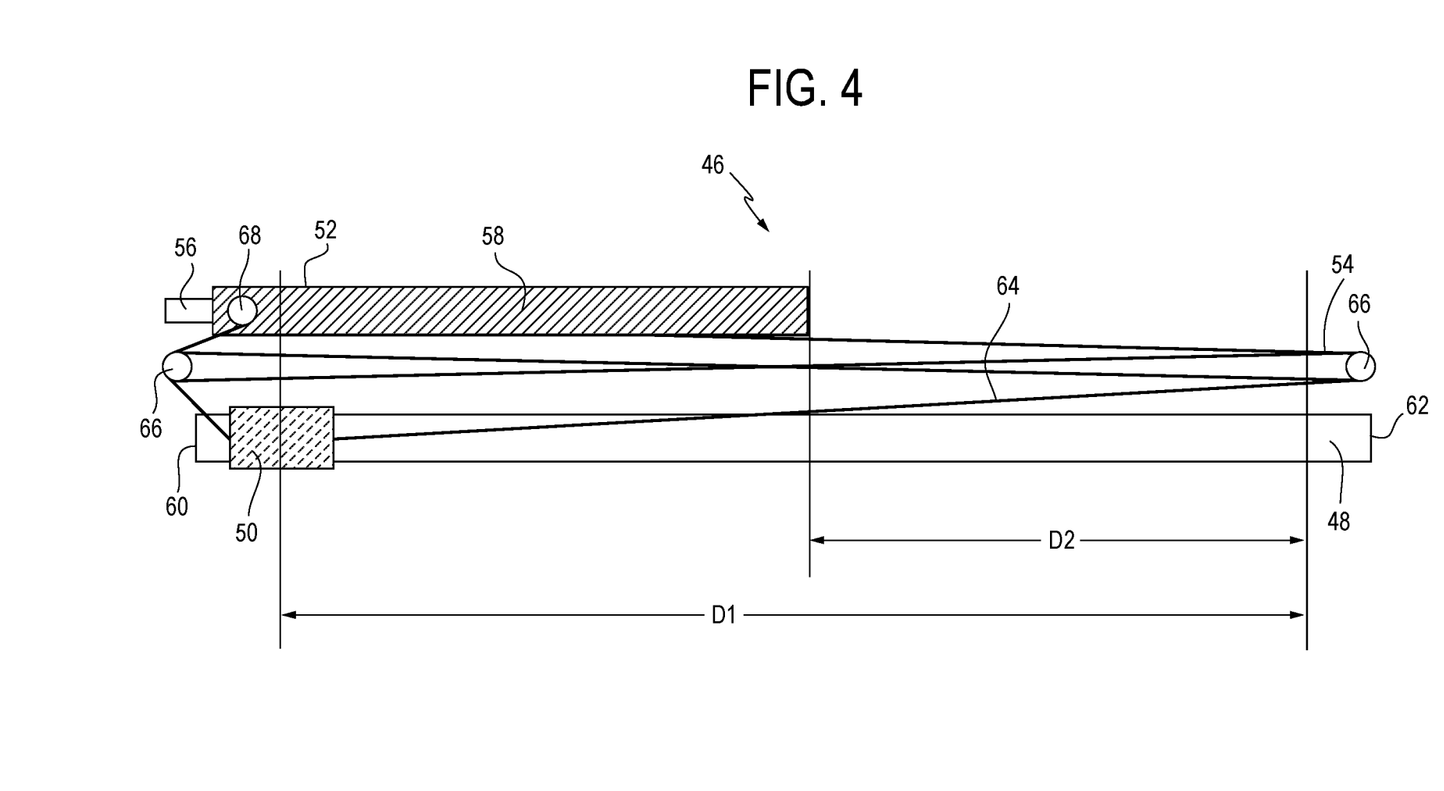
FIG. 4 is a diagram showing a side view of a drive system for a telescoping boom in a retracted drive position, according to an embodiment.
Figure 5:
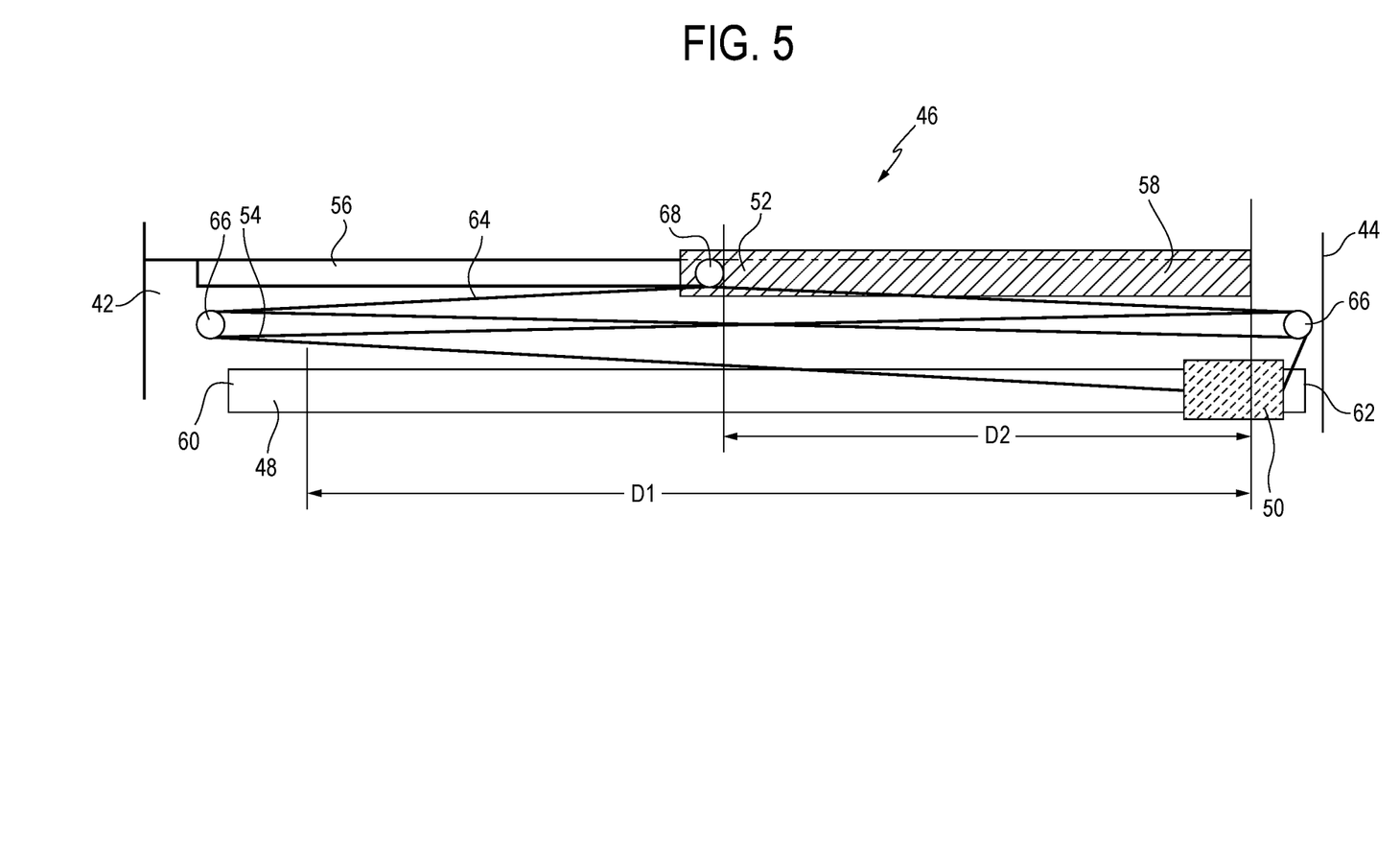
FIG. 5 is a diagram showing a side view of the drive system for a telescoping boom of FIG. 4 in an extended drive position, according to an embodiment.

Referring to FIGS. 2-6, the telescoping boom 22 includes a drive system 46 for driving the one or more telescoping sections 36, 38, 40 for movement relative to the base section 34, and in turn, to move the telescoping boom 22 between the retracted and extended boom positions. FIGS. 2 and 3 are perspective views of the drive system 46 in a retracted drive position (FIG. 2) and an extended drive position (FIG. 3), according to an embodiment. FIGS. 4 and 5 are diagrams showing a side view of the drive system 46 in the retracted drive position (FIG. 4) and the extended drive position (FIG. 5), according to an embodiment. FIG. 6 is cut-away side view of the drive system 46 installed in a telescoping boom 22 according to an embodiment. As described above, and shown in FIG. 6, in one embodiment, the one or more telescoping sections may include only a first telescoping section 36 configured for telescoping movement relative to the base section 34. However, it is understood that in other embodiments additional telescoping sections may be interposed between the base section 34 and the first telescoping section 36 in the embodiment shown in FIG. 6.

With further reference to FIGS. 2-6, according to an embodiment, the drive system 46 includes an elongated member 48, a locking head 50 configured for movement on the elongated member 48, an actuator 52 configured to drive the locking head 50 along the elongated member 48, and a cabling assembly 54 interconnected between the actuator 52 and the locking head 50 such that the actuator 52 drives the locking head 50 via the cabling assembly 54. In one embodiment, the actuator 52 may be a linear actuator, such as a rod-barrel assembly. Accordingly, in one embodiment, the actuator 52 includes a rod 56 and a barrel 58. One of the rod 56 and the barrel 58 is movable, or extendable, relative to the other of the rod 56 and the barrel 58. In one embodiment, the other of the rod 56 and barrel 58 may be fixed or stationary. In one embodiment, the rod 56 is slidably received within the barrel 58. The rod-barrel assembly 52 may be, for example, pneumatically or hydraulically driven as understood in the art. Other suitable linear actuators are envisioned as well.

With reference to FIGS. 2-6, and with particular reference to FIGS. 4 and 5, in one embodiment, the locking head 50 may move along the elongated member 48 a first distance D1 when the drive system 46 is moved from the retracted drive position (FIG. 4) to the extended drive position (FIG. 5). Similarly, the rod-barrel assembly 52 is extended by moving one of the rod 56 and the barrel 58 relative to the other over a second distance D2 less than the first distance D1 when the drive system 46 is moved from the retracted drive position to the extended drive position.

In one embodiment, the drive system 46 is disposed within the base section 34. Further, in one embodiment, the drive system 46 is disposed within the base section 34 when in both the retracted drive position and the extended drive position. That is, in one embodiment, the drive system 46 does not extend beyond the distal end 44 of the base section 34 in either of the retracted drive position or the extended drive position. For example, according to one embodiment, the rod-barrel assembly 52 may be moved from a retracted position to a fully extended position that does not extend beyond the distal end 44 of the base section 34. That is, according to one embodiment, the rod-barrel assembly 52 may extend toward the distal end 44 to a fully extended position that is between the base end 42 and distal end 44 of the base section. In one embodiment, the drive system 46 may be disposed completely within the base section 34.

The elongated member 48 may be a substantially rigid member and may be formed, for example, as a rod, tube, rail or other suitable structure on which the locking head 50 may move. The elongated member 48 may be fixed in length. In one embodiment, the elongated member 48 does not extend beyond the distal end 44 of the base section 34. For example, in one embodiment, the elongated member 48 may have a first end 60 disposed at or near the base end 42 of the base section 34 and a second end 62 disposed within the base section 34. The elongated member 48 may also have a length that is less than the length of the base section 34.

As best shown in FIGS. 4 and 5, the cabling assembly 54 includes a cable 64 and a plurality of sheaves 66, 68 around which the cable 64 extends. In one embodiment, the plurality of sheaves 66, 68 are positioned so that movement, i.e., extension or retraction, of the rod-barrel assembly 52, causes the locking head 50 to move substantially in the same direction of the extension or retraction of the rod-barrel assembly 52. In one embodiment, the plurality of sheaves 66, 68 may include two or more fixed sheaves 66, i.e., sheaves that are mounted at a fixed position relative to the drive system 46, and a movable sheave 68 mounted on and movable with the rod-barrel assembly 52. In one embodiment, the fixed sheaves 66 may be mounted directly or indirectly within the base section 34, for example, on the elongated member 48 or a block connected to the elongated member 48. In one embodiment, the cable 64 is fixedly attached to the locking head 50 such that movement of the rod-barrel assembly 52 causes movement of the cable 64 on the sheaves 66, 68. Movement of the cable 64, in turn, applies a pulling force on the locking head 50 to move the locking head 50 on the elongated member 48. In one embodiment, one or more sheaves of the plurality of sheaves 66, 68 may be configured to rotate with movement of the cable 64. In one embodiment, the cable 64 may be suitable metallic cable. Alternatively, the cable 64 may be a rope or synthetic rope.

Accordingly, in the embodiments described above and shown in FIGS. 1-6 the locking head 50 may be driven by the actuator 52 to move along the elongated member 48. As shown in FIGS. 4 and 5, when the drive system 46 moves from the retracted drive position to the extended drive position, the locking head 50 moves over a longer distance, i.e., the first operational distance D1, than the rod-barrel assembly 52, which extends over the second operational distance D2, in the same amount of time as the locking head 50 moves over the first operational distance D1. Thus, the locking head 50 moves at a higher speed than the rod-barrel assembly 52. In one embodiment, the first operational distance D1 may be approximately twice as long as the second operational distance D2. Accordingly, the locking head 50 may be moved at a speed along the elongated member 48 that is approximately double the speed at which the rod-barrel assembly 52 extends or retracts.

Figure 7:
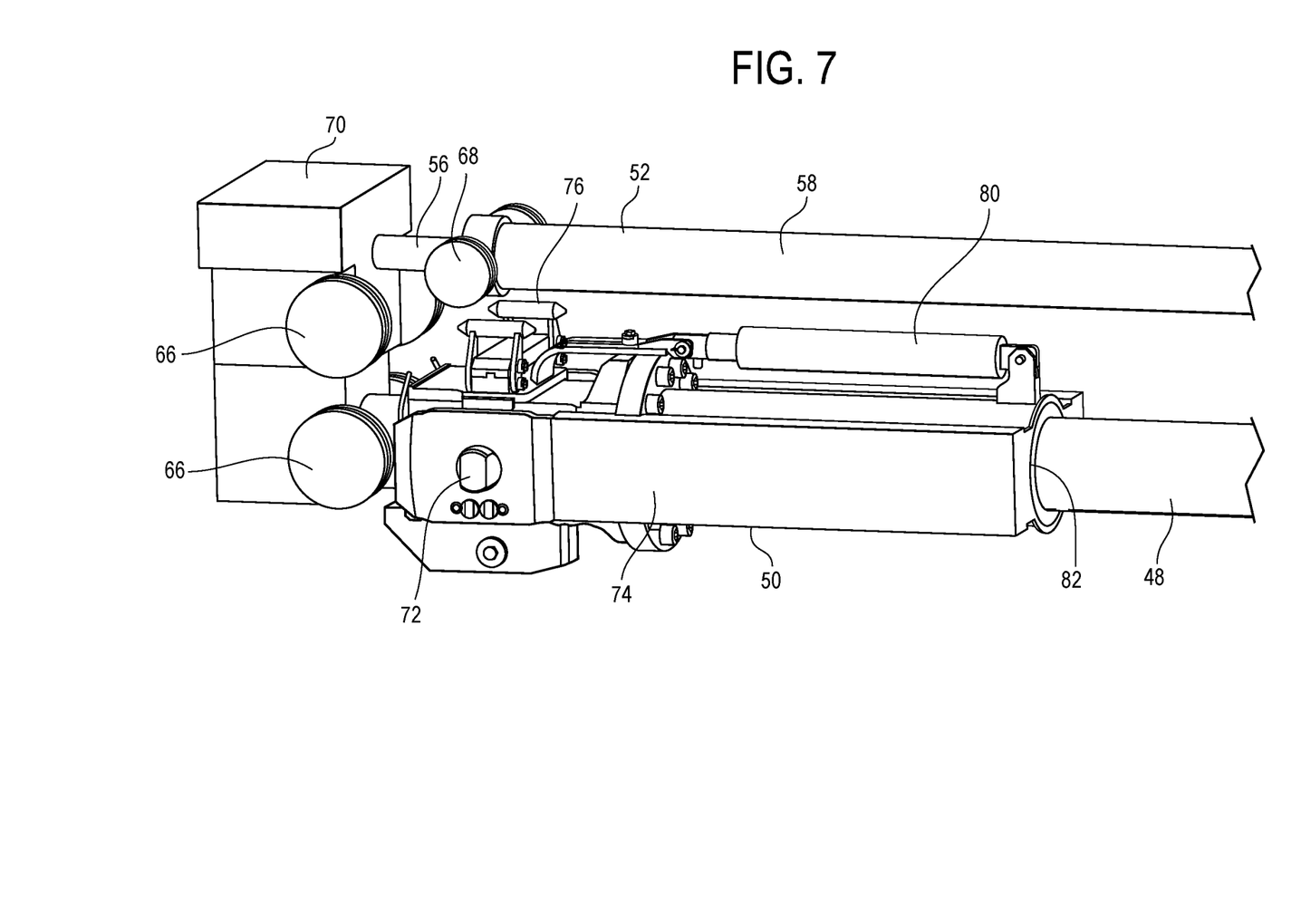
FIG. 7 is a perspective view of a locking head in a drive assembly for a telescoping boom, according to an embodiment.
Figure 8:
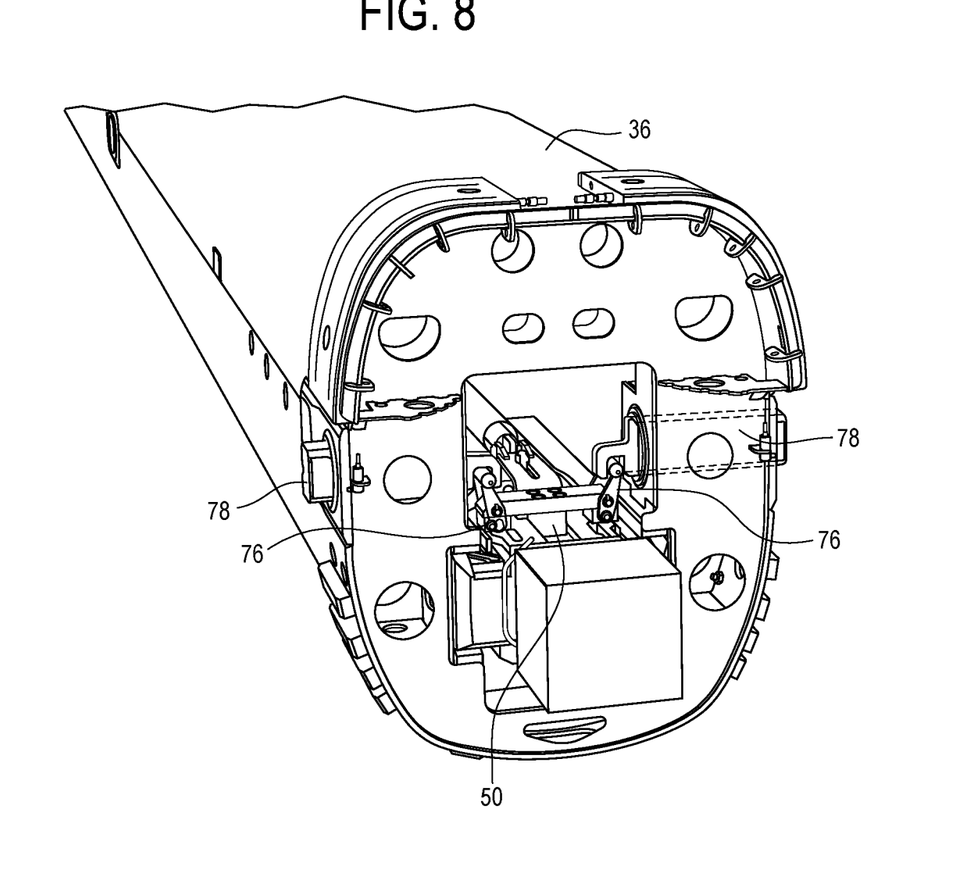
FIG. 8 is an end view showing a drive system installed in a telescoping boom, according to an embodiment.

FIG. 7 is an enlarged perspective view of the locking head 50, according to an embodiment. FIG. 8 is a perspective view of the locking head 50 disposed in one of the telescoping sections 36, 38, 40. For example, the telescoping section shown in FIG. 8 may be the third telescoping section 40. As detailed above, the third telescoping section 40 may be disposed within the base section 34 (omitted from FIG. 8 for clarity) and is telescopically movable relative thereto. In addition, the first and second telescoping sections 36, 38 (omitted from FIG. 8 for clarity) may be nested within the third telescoping section 40 and configured for telescoping movement relative thereto. It is understood that although reference is made to the third telescoping section 40 in FIG. 8, the telescoping section depicted in FIG. 8 could be any other telescoping section described herein. In one embodiment, the locking head 50 is configured to selectively engage with and disengage from a telescoping section, such as the third telescoping boom section 40. When engaged with the third telescoping section 40 (for example), movement of the locking head 50 on the elongated member 48 drives telescoping movement of the third telescoping section 40 relative to the base section 34. When disengaged from the third telescoping section 40, the locking head 50 may move relative to the third telescoping section 40 along the elongated member 48. In one embodiment, the elongated member 48 and the actuator 52 may be fixed at one end to a mounting block 70. The mounting block 70 may be secured to the superstructure 14, for example, at the base section 34.

In addition, the locking head 50 is configured to couple a telescoping section of the one or more telescoping sections 36, 38, 40 to an adjacent boom section 34, 36, 38 to substantially fix the telescoping section 36, 38, 40 against telescoping movement relative to the adjacent boom section 34, 36, 38 to which the telescoping section 36, 38 40 is coupled. For example, the first telescoping section 36 may be coupled to the second telescoping section 38 to hold the first telescoping section 36 in an extended position relative to the second telescoping section 38. The locking head 50 is also configured to uncouple a telescoping section of the one or more telescoping sections 36, 38, 40 from the adjacent boom section 34, 36, 38 to allow for telescoping movement of the telescoping section 36, 38, 40 relative to the adjacent boom section 34, 36, 38. For example, the first telescoping section 36 may be uncoupled from the second telescoping section 38 to allow the first telescoping section 36 to retract into the second telescoping section 38.

Referring to FIGS. 7 and 8, in one embodiment, the locking head 50 includes a suitable locking device understood to those skilled in the art for selectively engaging and disengaging with a telescoping section of the one or more telescoping sections 36, 38 40, such as one or more locking pins. In addition, in one embodiment, the locking head 50 includes a suitable coupling device understood to those skilled in the art to affect coupling and uncoupling of a telescoping section of the one or more telescoping sections 36, 38, 40 to and from the adjacent boom section 34, 36, 38, such as one or more coupling arms configured to actuate a coupling mechanism on the boom sections. An example of such a suitable locking device and suitable coupling device are shown and described in US Publication 2015/0041422 to Kaupert et al., which is incorporated herein by reference in its entirety.

Referring still to FIGS. 7 and 8, in one embodiment, the locking device of the locking head 50 may include one or more actuatable locking pins 72. The one or more locking pins 72 may be extended from a body 74 of the locking head 50 to engage one of the telescoping sections 36, 38, 40, and may be retracted toward or into the body to disengage the telescoping section 36, 38, 40. Further, in one embodiment, the coupling device may be one or more pivoting coupling arms 76 which may be actuated to operate one or more coupling members 78 for coupling and uncoupling the telescoping section 36, 38, 40 and the adjacent boom section 34, 36, 38. In FIGS. 7 and 8, the cable 64 is omitted, for clarity.

In one embodiment, the locking head 50 includes a lock actuator 80. For example, the lock actuator 80 may be mounted to the body 74 of the locking head 50. The lock actuator 80 may be operably coupled to one or more of the locking device and the coupling device. Accordingly, in one embodiment, the lock actuator 80 may drive or retract the locking pins 72 or pivot the coupling arms 76. The lock actuator 80 may be, for example, a pneumatic, hydraulic, electronic, magnetic or other known, suitable actuator. In another embodiment, the lock actuator 80 may be positioned remote from the locking head 50, and operably connected to the locking head 50, to operate the locking device and the coupling device. In one embodiment, separate lock actuators may be provided to actuate the locking device and the coupling device.

Referring again to FIG. 7, in one embodiment, the locking head 50 may be configured for sliding movement on the elongated member 48. For example, the locking head 50 may include a channel, groove, bore 82, or the like, configured to at least partially receive the elongated member 48 for sliding engagement with respect to the elongated member 48. In another embodiment, the locking head 50 may be configured for rolling movement on the elongated member 48. For example, the locking head 50 may include a rolling element, such as a roller bearing, a ball bearing, a wheel, and the like configured for rolling engagement with the elongated member 48. In other embodiments, known, suitable engagements between the locking head 50 and the elongated member 48 may be used that allow for movement of the locking head 50 on the elongated member 48.

In the embodiments above, the lock actuator 80 may actuate the locking pins 72 to engage with a telescoping section. The actuator of the drive system, for example, the rod-barrel assembly 52, may then be extended to drive the locking head 50 via the cabling assembly 54. The locking head 50 is driven along a first distance on the elongated member 48 toward the second end 62, and the actuator 52 is extended a second distance, less than the first distance, to extend the telescoping section, for example the first section 36, outward from the base section 34 and any other retracted telescoping sections, such as the second and third sections 38, 40, in one embodiment. The first distance generally corresponds to a length of the telescoping section being extended. With the telescoping section extended, the lock actuator 80 may then actuate the coupling arms 76 to couple the telescoping section to an adjacent boom section to hold the telescoping section in an extended position relative to the adjacent boom section. The lock actuator 80 may then actuate the locking pins 72 to disengage from the telescoping section. The actuator 52 may then be retracted over the second distance to drive the locking head 50 the first distance along the elongated member 48 toward the first end 60. The locking head 50, when disengaged from the telescoping section, is movable relative to the telescoping section. The process above may be repeated to extend additional telescoping sections.

To retract a telescoping section of the boom, the locking head 50 may be disposed at or near the first end 60 of the elongated member 48 with the locking pins 72 disengaged from a telescoping section. The actuator 52 may be extended across the second distance to drive the locking head 50 over the first distance via the cabling assembly 54. The locking head 50 is driven toward the second end 62 of the elongated member 48. The lock actuator 80 may actuate the locking pins 72 to engage with the telescoping section. The lock actuator 80 may also actuate the coupling arms 76 to uncouple the telescoping section from an adjacent boom section. The actuator 52 may then be retracted over the second distance to drive the locking head 50 along the elongated member 48 over the first distance. The telescoping section moves with the locking head 50 by way of the locking pin engagement to retract into the adjacent boom section and the base section 34. The lock actuator 80 may actuate the coupling arms to couple the now-retracted telescoping section to an immediately adjacent boom section, such as an adjacent, retracted telescoping section or the base section, to retain the now retracted telescoping section in its retracted position. The lock actuator 80 may then actuate the locking pins 72 to disengage from the telescoping section. The process above may be repeated to retract additional telescoping sections.

Thus, in the embodiments above, the locking head 50 moves a first distance in response to extension of the actuator 52 over a second distance in a fixed time period. The first distance is greater than the second distance, and in one embodiment, is approximately twice as long as the second distance. Thus, the locking head 50 moves at a greater speed than an extension or retraction speed of the actuator 52. The extension or retraction speed of the actuator 52, in one embodiment, refers to a speed of one of the rod and barrel relative to the other of the rod and barrel. Accordingly, when engaged with a telescoping section, the locking head 50 may drive the telescoping section to extend or retract at a speed greater than the extension or retraction speed of the actuator 52. As such, in the embodiments above, a telescoping section may be driven to extend or retract at a greater speed compared to conventional telescoping boom assemblies driven by a telescoping cylinder. In addition, in the embodiments herein, an extension length, corresponding to the second distance, of the actuator 52 may be reduced compared to a telescoping cylinder in a conventional telescoping boom assembly. Accordingly, a time required for the actuator described herein to extend and retract, or be repositioned, may be reduced compared to the conventional telescoping cylinder, when operated at the same speed. As such, the time required to extend or retract a telescoping section may be reduced compared to conventional telescoping boom assemblies.

Further, because the drive assembly 46 is disposed in the base section 34 and does not extend beyond the distal end 44 of the base section 34, a weight distribution of the drive assembly 46 may be limited to the base section 34. Thus, a load on the telescoping boom may be reduced compared to known telescoping boom assemblies having a telescoping cylinder extending beyond a base section. Further still, by separating the locking head 50 from actuator 52 as described in the embodiments above, the need for a conventional trombone tube in a telescoping cylinder to drive a locking pin system and/or coupling system is eliminated. Rather, a separate lock actuator 80 may be provided on the locking head 50 or operably connected to the locking head 50 as described in the embodiments above.

Figure 9:
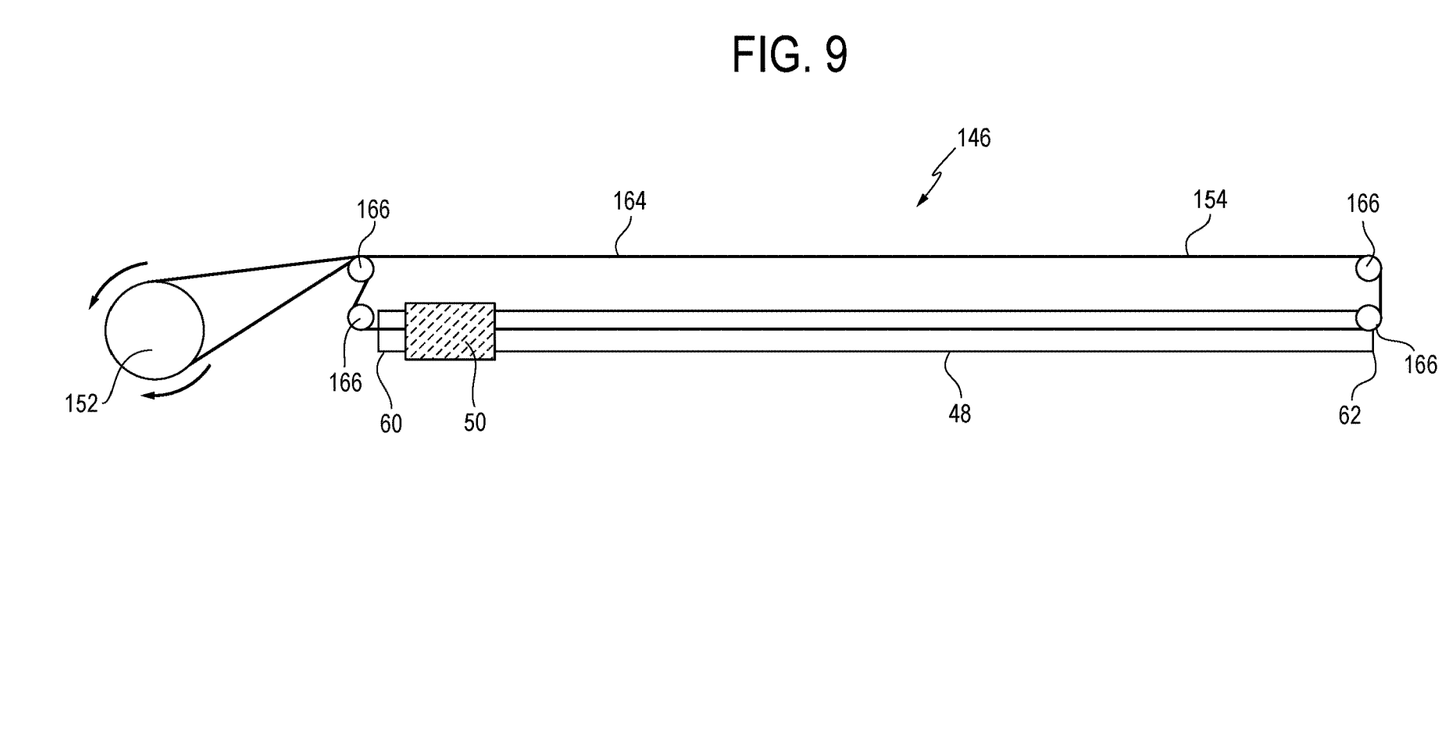
FIG. 9 is a diagram showing a side view of a drive system for a telescoping boom in a retracted drive position, according to another embodiment.
Figure 10:
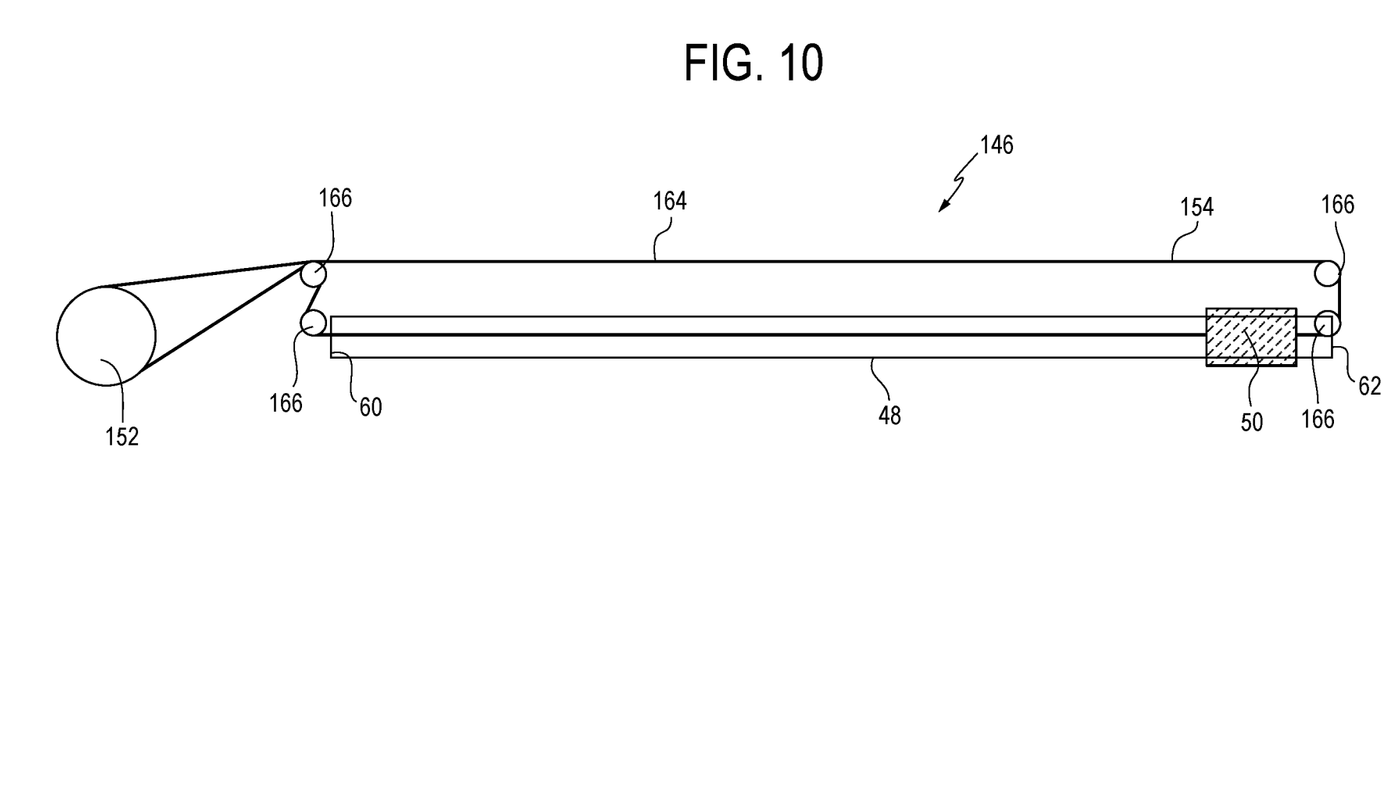
FIG. 10 is a diagram showing a side view of the drive system for a telescoping boom of FIG. 9 in an extended drive position, according to an embodiment.

FIGS. 9 and 10 are side views of a drive assembly 146 for a telescoping boom according to another embodiment. Referring to FIGS. 9 and 10, in one embodiment, the drive assembly 146 may include the locking head 50 and the elongated member 48 substantially as described above. However, the actuator may be a cable drum 152. The cable drum 152 is connected to a cabling assembly 154 having a cable 164 and one or more sheaves 166 around which the cable 164 extends. The cable 164 may be fixedly attached to the locking head 50. The sheaves 166 may be fixed relative to, for example, the cable drum 152 and/or the elongated member 48. The sheaves 166 may rotate on an axis in response to movement of cable 164. The cable drum 152 may be suitably mounted to the superstructure 14. The cable 164 may be a metallic cable, rope or synthetic rope.

Accordingly, rotation of the cable drum 152 in a first direction may drive the cable 164 for movement over the sheaves 166 to drive the locking head 50 for movement along the elongated member 48. Thus, the locking head 50 may be moved from a position at or near the first end 60 of the elongated member 48 (FIG. 9) to a position at or near the second end 62 of the elongated member 48 (FIG. 10). In one embodiment, with the locking member 50 at or near the first end 60, the drive system 146 is in a retracted drive position (FIG. 9). With the locking member at or near the second end 62, the drive system is in an extended drive position (FIG. 10). Rotation of the cable drum 152 in a second direction causes movement of cable 164 over the sheaves 166 to drive the locking head 50 toward the first end 60.

In the embodiments of FIGS. 9 and 10, movement and speed of the locking head 50 may be closely controlled by controlling a rotational speed of the cable drum 152. In addition, a speed of the locking head 50, and in turn, a telescoping section to which the locking head 50 is engaged, may exceed a speed at which a telescoping cylinder in a conventional telescoping boom may extend or retract. For example, in one embodiment, the cable drum 152 may be driven by a motor to rotate at a speed that, when translated to a linear motion via the cabling assembly 154, exceeds a speed at which a conventional telescoping cylinder may extend or retract.

In some embodiments, the drive system 46, 146 may further include a cable tensioner to reduce lag in the cabling assembly 54, 154. Accordingly, movement of the actuator 52, 152 may be more directly transmitted to the locking head 50 via the cabling assembly 54, 154. In addition, a length sensor may be used with closed-loop feedback to determine, for example, a position of the locking head 50 on the elongated member 48, and control operation of the actuator 52, 152 based on the position of the locking head 50.

It is understood the various features from any of the embodiments above are usable together with the other embodiments described herein. Further, it is understood that same or similar terminology used across the different embodiments above refers to the same or similar component, with the exception of any differences described or shown in the figures.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A telescoping boom comprising:
   a plurality of boom sections including a base section and one or more telescoping sections configured for telescoping movement relative to the base section;
   an elongated member disposed in the base section;
   a locking head configured for movement on the elongated member and configured to selectively engage with and disengage from a telescoping section of the one or more telescoping sections;
   an actuator configured to drive the locking head along the elongated member; and
   a cabling assembly interconnected between the actuator and the locking head such that the locking head is driven to move along the elongated member in response to operation of the actuator, the cabling assembly comprising a cable and a plurality of sheaves,
   wherein the actuator is a rod-barrel assembly comprising a rod and a barrel, wherein one of the rod and the barrel is movable relative to the other of the rod and barrel to extend or retract the rod-barrel assembly.

2. The telescoping boom of claim 1, wherein the cable extends around the plurality of sheaves, and movement of the rod-barrel assembly drives movement of the cable on the plurality of sheaves.

3. The telescoping boom of claim 2, wherein the locking head moves a first distance on the elongated member in response to extension or retraction of the rod-barrel assembly over a second distance in a fixed time period.

4. The telescoping boom of claim 3, wherein the cable and the plurality of sheaves are arranged such that the first distance is greater than the second distance.

5. The telescoping boom of claim 1, wherein the locking head selectively engages with and disengages from the telescoping section with a locking device, and the locking head further comprises a lock actuator for actuating the locking device.

6. The telescoping boom of claim 5, wherein the locking head further comprises a coupling device for coupling and uncoupling the telescoping section to an adjacent boom section, wherein the lock actuator actuates the coupling device.

7. The telescoping boom of claim 1, wherein the base section has a base end and a distal end and the elongated member has a first end and a second end, wherein the first end is positioned at or near the base end and the second end is positioned between the base end and the distal end.

8. The telescoping boom of claim 1, wherein the base section has a base end and a distal end, and the rod-barrel assembly is extendable toward the distal end to a fully extended position between the base end and the distal end.

9. A drive system for a telescoping boom comprising:
an elongated member;
a locking head configured to be driven on the elongated member;
an actuator configured to drive the locking head on the elongated member; and
a cabling assembly interconnected between the actuator and the locking head such that the locking head is driven on the elongated member in response to operation of the actuator, the cabling assembly comprising a cable and a plurality of sheaves,
wherein the actuator is a rod-barrel assembly comprising a rod and a barrel, wherein one of the rod and the barrel is movable relative to the other of the rod and barrel to extend or retract the rod-barrel assembly.

10. The drive system of claim 9, wherein the cable extends around the plurality of sheaves, and movement of the rod-barrel assembly drives movement of the cable on the plurality of sheaves.

11. The drive system of claim 10, wherein the locking head is driven a first distance on the elongated member in response to extension or retraction of the rod-barrel assembly over a second distance in a fixed time period, wherein the first distance is greater than the second distance.

12. The drive system of claim 11, wherein the first distance is twice as long as the second distance.

13. The drive system of claim 9, wherein the locking head further comprises a locking device and a lock actuator to actuate the locking device.

14. The drive system of claim 13, wherein the locking head further comprises a coupling device and the lock actuator actuates the coupling device.

* * * * *